(12) United States Patent
Ohyama (10) Patent No.: US 6,583,795 B1
(45) Date of Patent: Jun. 24, 2003

(54) DISPLAY CONTROL APPARATUS, MESSAGE DISPLAY METHOD, AND STORAGE MEDIUM FOR MESSAGE DISPLAY CONTROL SOFTWARE PRODUCT

(75) Inventor: Yuhji Ohyama, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/439,638

(22) Filed: Nov. 12, 1999

(30) Foreign Application Priority Data

Mar. 17, 1999 (JP) ............................................. 11-072109

(51) Int. Cl.[7] ................................................ G09G 5/00
(52) U.S. Cl. ...................... 345/785; 345/762; 345/744
(58) Field of Search ................................ 345/785, 786, 345/973, 753, 758, 762, 744, 700

(56) References Cited

U.S. PATENT DOCUMENTS

| | | | | |
|---|---|---|---|---|
| 5,327,157 A | * | 7/1994 | Akiyama et al. | ............ 348/785 |
| 6,219,045 B1 | * | 4/2001 | Leahy et al. | ................. 345/757 |
| 6,337,697 B1 | * | 1/2002 | Kim | ............................ 345/784 |
| 6,345,290 B2 | * | 2/2002 | Okada et al. | ................. 709/204 |
| 6,370,563 B2 | * | 4/2002 | Murakami et al. | ........... 709/205 |

OTHER PUBLICATIONS

Neuron Data, Inc., Dialoglink for the windows operating sytem May 1995, knight–Ridder information, Inc. Version 2.1 pp. 1–2, 4–1–4–8.*

* cited by examiner

*Primary Examiner*—Kristine Kincaid
*Assistant Examiner*—Peng Ke
(74) *Attorney, Agent, or Firm*—James R. Nock; Leslie J. Payne (57) ABSTRACT

To provide a display control system that outputs, to a display screen, information messages that are generated over the elapse of time, whereby a user can select either an automatic scrolling mode, in which new messages are continually displayed, or an automatic scrolling halt mode. The ON/OFF automatic scrolling state set by a user is held in a storage area and is referred to when a new, additional message is received for storage. If the automatic scrolling state is ON, the oldest message is removed from a window, and the new message is added. If the automatic scrolling state is OFF, automatic scrolling of the window is not performed, the current display is unchanged, and the new message is added at the end of a virtual display area (message group data that can be displayed in the display area). The display area of the window includes a scroll bar that an operator can manually manipulate to refer to a new message or to an old message that is not currently displayed.

5 Claims, 8 Drawing Sheets

Fig. 10 though a message displayed on the
DISPLAY CONTROL APPARATUS, MESSAGE DISPLAY METHOD, AND STORAGE MEDIUM FOR MESSAGE DISPLAY CONTROL SOFTWARE PRODUCT

TECHNICAL FIELD

The present invention relates to a system for controlling the output of messages to a display screen, and more specifically, a system whereby, in a window on the screen wherein new, additional messages are sequentially displayed, a user either can choose automatic scrolling, for the continuous display of new text or messages, or can elect to halt scrolling.

BACKGROUND OF THE INVENTION

One display control system is available whereby information that occurs in consonance with the elapse of time, or in accordance with an existing system condition is output as a message displayed on a screen. However, since a conventional display control system automatically scrolls messages displayed on the screen, so that a displayed message is removed as a new message is output to the screen, an operator can not monitor older messages displayed on the screen.

SUMMARY OF THE INVENTION

It is one object of the present invention to provide a display control system whereby an operator is permitted to dynamically elect either to refer to a new message or to an old message. It is another object of the present invention to provide a display control system whereby an operator experiences no discomfiture when performing an operation.

In a window, opened on a screen, wherein new text or a new message is sequentially added and displayed at the bottom, an operator can dynamically elect either to continue the automatic scrolling of the screen, so as to continuously display new text or new messages, or to halt automatic scrolling, and thereby make it possible for desired text or messages to be selectively available for display in the window.

The ON/OFF automatic scrolling state set by a user is held in a storage area of a program and is referred to when a new, additional message is received for storage. If the automatic scrolling state is ON, the oldest message currently displayed in the display area of a window is removed, and the new message is added. If the automatic scrolling state is OFF, automatic scrolling of the window is not performed, the current display is unchanged, and the new message is added at the end of a virtual display area (message group data that can be displayed in the display area). According to the present invention, the display area of the window includes a scroll bar that an operator can manually manipulate to refer to a new message or to an old message that is not currently displayed.

According to one aspect of the present invention, provided is a display control method used by a display control apparatus, which includes a display device and an input device, that displays an obtained message, in the display area of a window with a scroll bar, the display control method comprising the steps of: (a) storing scroll option information in response to a scroll option change operation performed by an operator; (b) detecting the reception of a new message; (c) referring to the stored scroll option information to determine whether an automatic scroll mode is thereby specified; (d) removing from the display area, when it is ascertained at the step (c) that the automatic scroll mode is specified by the scroll option information, at least one portion of a message that is currently displayed, and displaying in the display area at least one portion of the new message; and (e) adding the new message to a virtual display area, when it is ascertained at the step (c) that the automatic scroll mode is not specified by the scroll option information, and setting a state wherein the operator can use the scroll bar to refer to a desired message included in the virtual display area.

In the claims of this specification, the "display area" includes a "list display area," which described later in the preferred embodiment. The "virtual display area" includes a "list display area," which described later in the preferred embodiment. The "message" includes "text or message," which described later in the preferred embodiment.

According to another aspect of the present invention, provided is a display control method used by a display control apparatus, which includes a display device and an input device and which displays an obtained message in the display area of a window with a scroll bar on the display device, the display control method comprising the steps of: (a) referring to scroll option information, which is stored in advance in the display control apparatus, to determine whether the scroll option information specifies an automatic scroll mode; (b) removing from the display area, when it is ascertained at the step (a) that the scroll option information specifies the automatic scroll mode, at least one portion of a message that is currently displayed, and displaying in the display area at least one portion of a received new message by the display control apparatus; and (c) adding the received new message to a virtual display area, when it is ascertained at the step (a) that the scroll option information does not specify the automatic scroll mode, and setting the display control apparatus to a state wherein the operator can use the scroll bar to refer to a desired message included in the virtual display area.

According to an additional aspect of the present invention, provided is a display control apparatus, which includes a display device and an input device, that displays an obtained message, in the display area of a window with a scroll bar, the display control apparatus comprising: (a) a scroll option change unit for storing scroll option information in response to a scroll option change operation performed by an operator; (b) an input event detector for detecting the reception of a new message; (c) a new message processor for referring to the stored scroll option information to determine whether an automatic scroll mode is thereby specified; (d) a display area manager for, when it is ascertained that the automatic scroll mode is specified by the scroll option information, removing from the display area at least one portion of a message that is currently displayed, and displaying in the display area at least one portion of the new message, and for, when it is ascertained that the automatic scroll mode is not specified by the scroll option information, adding the new message to a virtual display area, and setting a state wherein the operator can use the scroll bar to refer to a desired message included in the virtual display area.

According to a further aspect of the present invention, provided is a storage medium storing a message display control software product for a display control apparatus, which includes a display device and an input device and which displays an obtained message, in the display area of a window with a scroll bar, the display control software product comprising: (a) program code for instructing the display control apparatus to store scroll option information in response to a scroll option change operation performed by an operator; (b) program code for instructing the display control apparatus to detect the reception of a new message; (c) program code for instructing the display control apparatus to refer to the stored scroll option information to determine whether an automatic scroll mode is thereby specified; (d) program code for instructing the display control apparatus to remove from the display area, when it is ascertained at the step (c) that the automatic scroll mode is specified by the scroll option information, at least one portion of a message that is currently displayed, and to display in the display area at least one portion of the new message; and (e) program code for instructing the display control apparatus to add the new message to a virtual display area, when it is ascertained at the step (c) that the automatic scroll mode is not specified by the scroll option information, and to set a state wherein the operator can use the scroll bar to refer to a desired message included in the virtual display area.

According to still another aspect of the present invention, provided is a storage medium storing a message display control software product for a display control apparatus, which includes a display device and an input device and which displays an obtained message in the display area of a window with a scroll bar on the display device, the display control software product comprising: (a) program code for instructing the display control apparatus to refer to scroll option information, which is stored in advance in the display control apparatus, to determine whether the scroll option information specifies an automatic scroll mode; (b) program code for instructing the display control apparatus to remove from the display area, when it is ascertained that the scroll option information specifies the automatic scroll mode, at least one portion of a message that is currently displayed, and to display in the display area at least one portion of a received new message by the display control apparatus; and (c) program code for instructing the display control apparatus to add the received message to a virtual display area, when it is ascertained that the scroll option information does not specify the automatic scroll mode, and to set the display control apparatus to a state wherein the operator can use the scroll bar to refer to a desired message included in the virtual display area.

DETAILED DESCRIPTION OF THE INVENTION

A. Outline

According to the present invention, in a window in which new text or messages are sequentially added at the bottom of a screen, a user can click a check box in a menu or a dialogue box, or on a tool bar to select either automatic scrolling, for the continuous display of new text or messages, or manual, user controlled scrolling. As a result, at all times desired text or messages can be displayed on a screen in a window.

Figure 1:
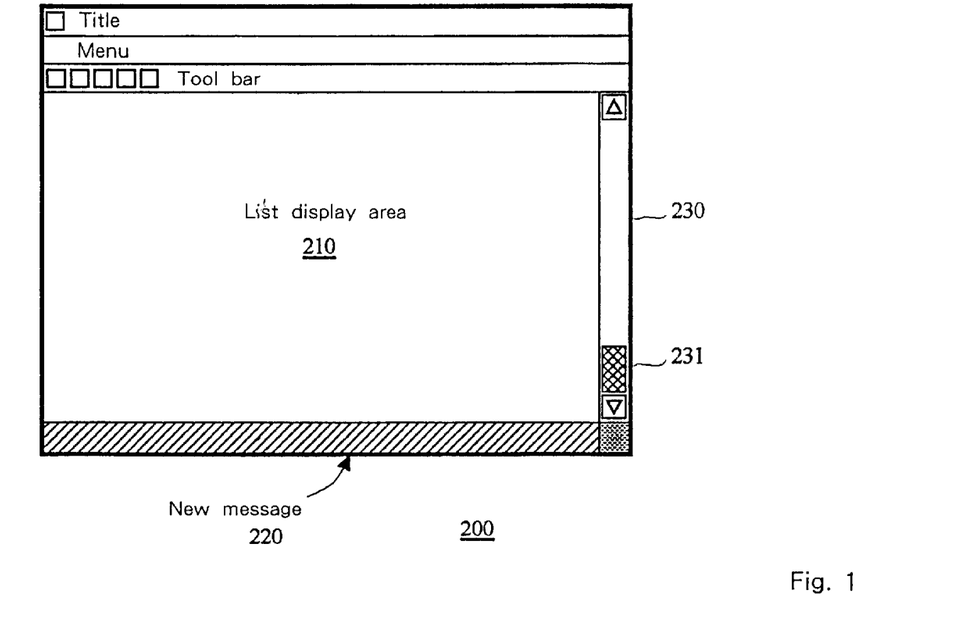
FIG. 1 is a diagram for explaining the outline of the present invention.
Figure 2:
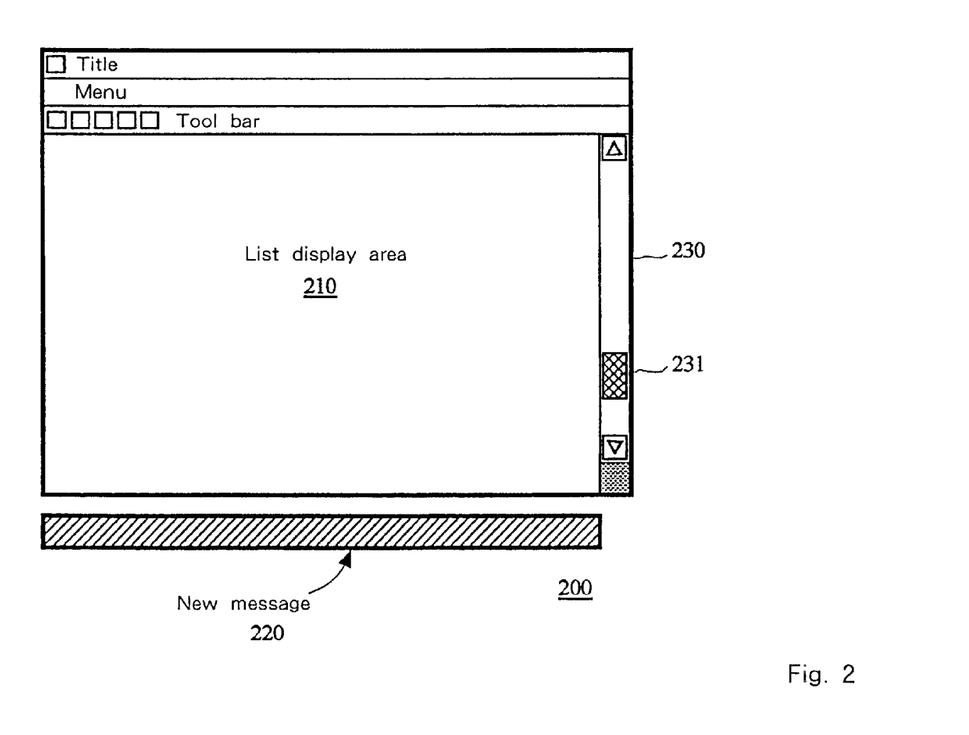
FIG. 2 is a diagram for explaining the outline of the present invention.
Figure 3:
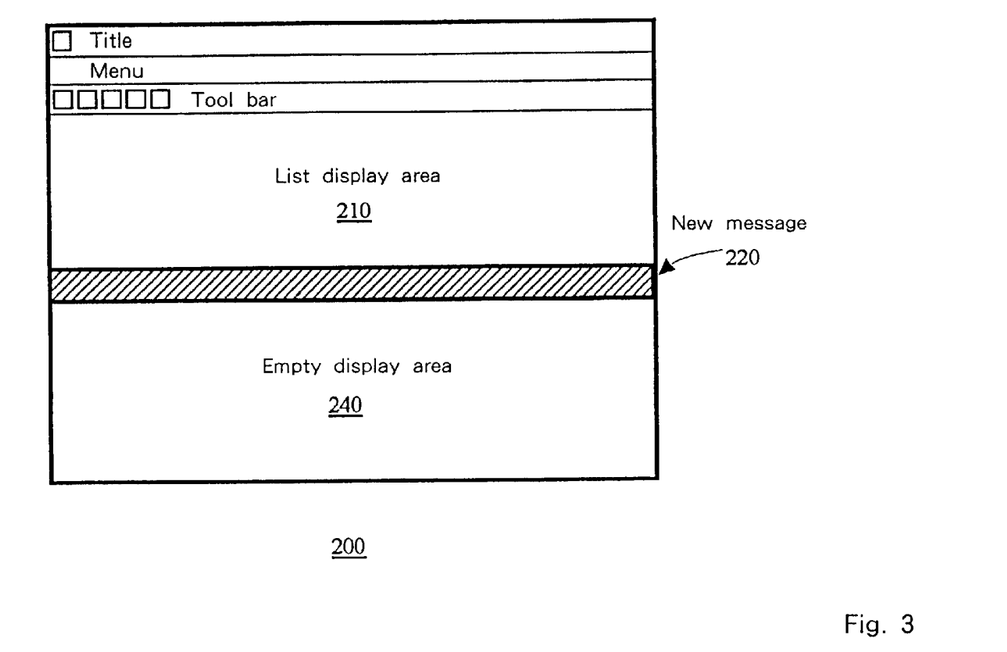
FIG. 3 is a diagram for explaining the outline of the present invention.

In the preferred embodiment, the ON/OFF setup for automatic scrolling is stored in a storage area of a program, and is referred to when a new message is to be added. When the automatic scrolling is ON, a window display area 210 is scrolled in order that the new message can be fitted on the screen (FIG. 1). If the automatic scrolling is OFF, the window display area 210 is not scrolled (FIG. 2), and a new message 220 is added at the end of a virtual list display area message group data that can be displayed in a list display area). An operator can thereafter manually refer to a new message or to an old message that is not currently displayed in the list display area. But when an empty display area 240 is present in the list display area 210, no scrolling is performed, even when the automatic scrolling is ON (FIG. 3).

B. Hardware Arrangement

Figure 4:
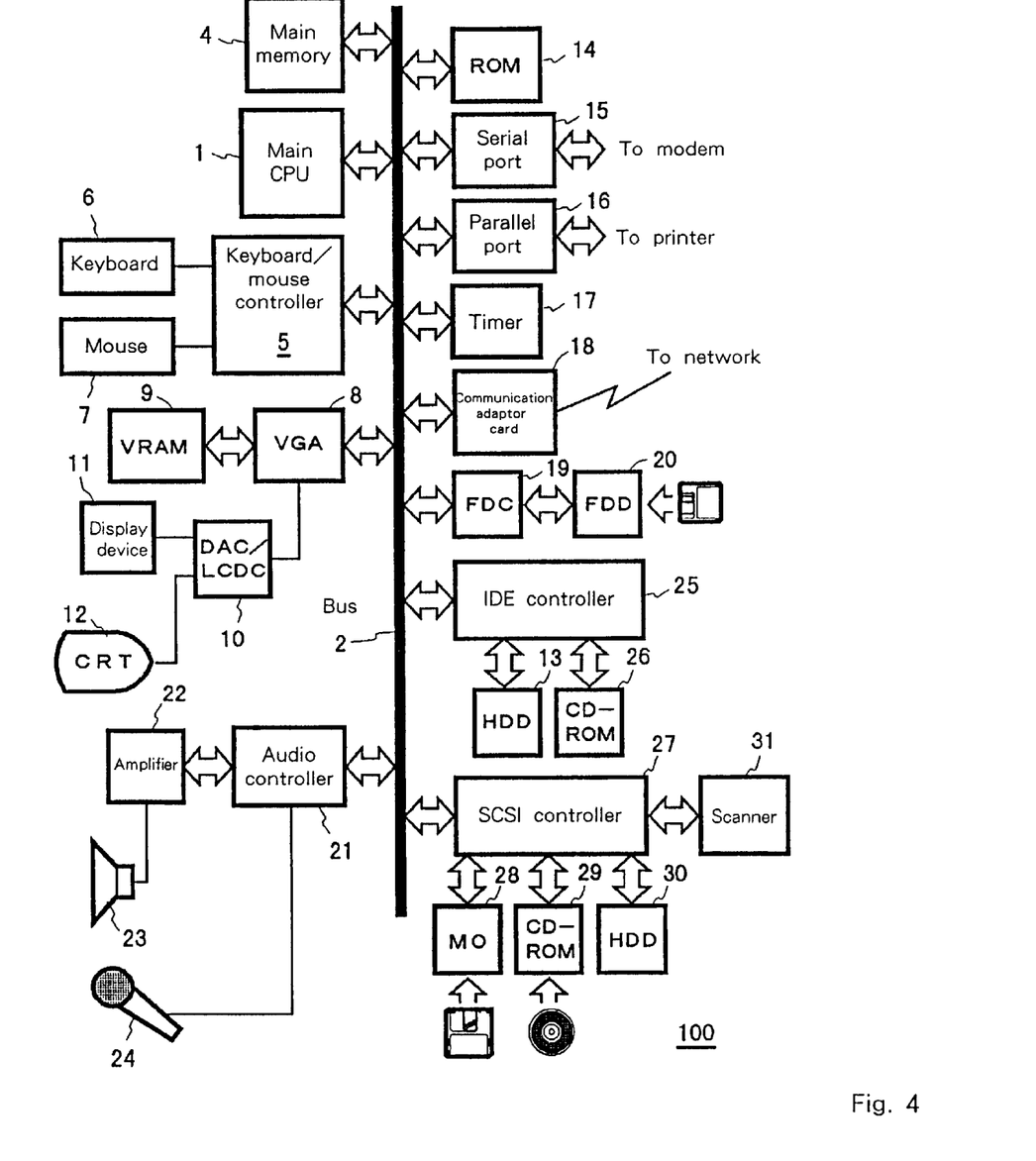
FIG. 4 is a block diagram illustrating a hardware arrangement of the present invention.

FIG. 4 is a diagram showing a hardware arrangement of a display control apparatus 100 according to the present invention. The display control apparatus 100 comprises a central processing apparatus (CPU) 1 and a memory 4. The CPU 1 and the memory 4 are connected by a bus 2 to hard disk drives 13 and 30, which are auxiliary storage devices. A floppy disk drive 20 (or a storage medium drive 26, 28, 29 or 30, such as an MO 28, a CD-ROM 26 or 29) is connected to the bus 2 via a floppy disk controller 19 (or an IDE controller 25 or a SCSI controller 27).

A floppy disk (or another storage medium, such as an MO or a CD-ROM) is inserted into the floppy disk drive 20 (or the storage medium drive 26, 28, 29 or 30, such as an MO and a CD-ROM), and code or data for a computer program, which interacts with an operating system and issues instructions to the CPU 1 for implementing the present invention, can be stored on the floppy disk or on the hard disk drive 13, or in a ROM 14. This computer program is executed by loading it into the memory 4. The code for the computer program either can be compressed, or can be divided into multiple segments for storage on multiple storage mediums.

The display control apparatus 100 further comprises user interface hardware components. These user interface hardware components include a pointing device (a mouse, a joystick or a track ball) 7, for entering screen location information; a keyboard 6, for entering data by using keys; and display devices 11 and 12, for providing visual data for a user. A loudspeaker 23 is used for receiving an audio signal from an audio controller 21 via an amplifier 22, and for outputting the signal as sound.

The display control apparatus 100 can communicate with another computer via a serial port 15 and a modem, or via a communication adaptor 18, such as a token ring.

The display control apparatus of the present invention can be provided by a normal personal computer (PC); by a workstation; by a computer incorporated in a television set, a facsimile machine or another electric home appliance; or by a combination of the components described above. It should be noted, however, that these components are merely examples, and not all of them are required for the present invention. In particular, since the present invention is related to the control of the output of message, the serial port 15, the communication adaptor 18, the audio controller 21, the amplifier 22 and the loudspeaker 23 are not necessarily required for the present invention.

A preferable operating system is, for example, Windows (trademark of Microsoft) or the X-WINDOW system (trademark of X Consortium) on AIX (trademark of IBM), which supports a GUI multi-window environment; however, the operating system of the present invention is not specifically limited. In the preferred embodiment, Windows 95 or Windows NT is used.

C. System Configuration

Figure 5:
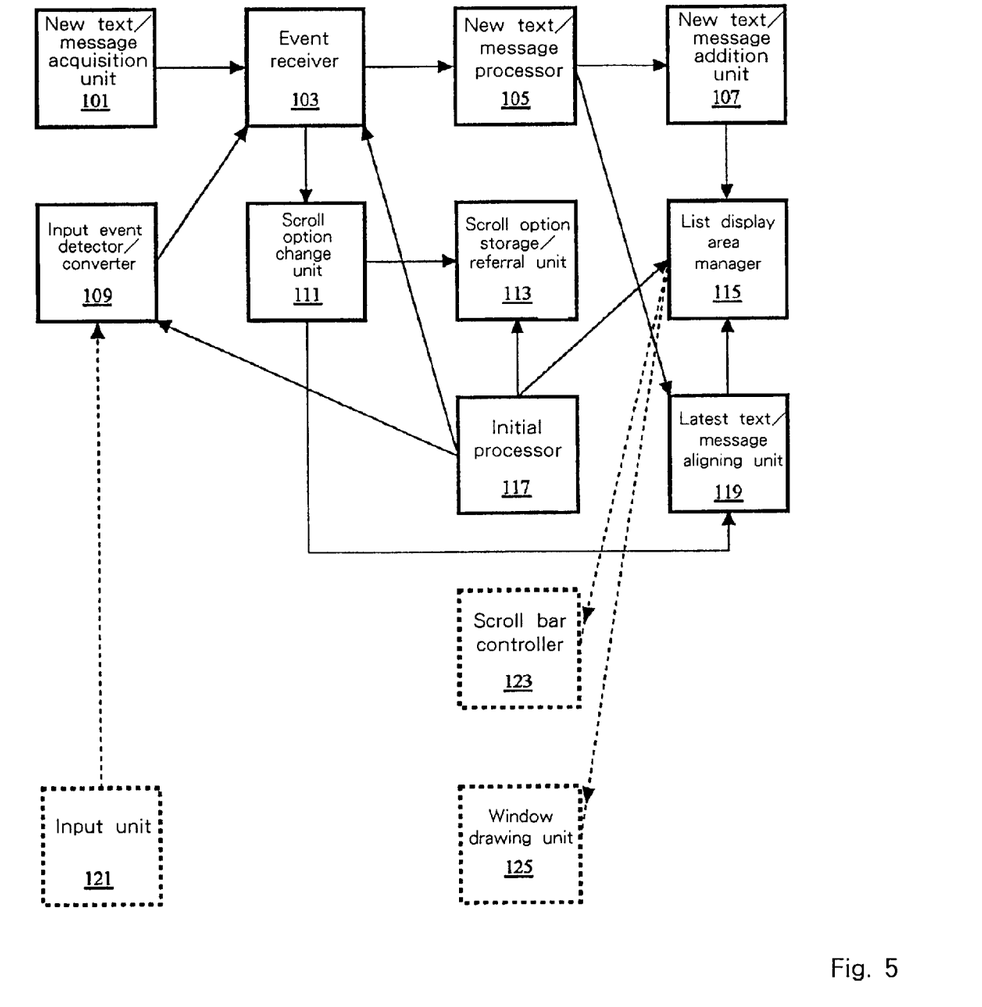
FIG. 5 is a block diagram illustrating the components of the present invention.

FIG. 5 is a block diagram illustrating a system configuration of the present invention. In the preferred embodiment, the display control apparatus 100 comprises: a new text/message acquisition unit 101; an event receiver 103; a new text/message processor 105; a new text/message addition unit 107; an input event detector/converter 109; a scroll option change unit 111; a scroll option storage/referral unit 113; a list display area manager 115; an initial processor 117; a latest text/message aligning unit 119; an input unit 121; a scroll bar controller 123; and a window drawing unit 125.

The new text/message acquisition unit 101 obtains the final text/message to be displayed in a list area 210 in a window 200 and transmits it to the event receiver 103. In the preferred embodiment, the new text/message acquisition unit 101 is implemented by communicating with another program and by using an asynchronous processing thread for receiving text, and by the transmission of a PostMessage.

The event receiver 103, which is called on each occurrence of an event, calls in turn a required function for each event. In the preferred embodiment, the functions assigned to this event receiver 103 are carried out by the window procedure of the main window.

After the event receiver 103 received new text or a message event, it calls the new text/message processor 105, and the new text/message processor 105 performs a process for identifying a scroll option and for actually displaying the new text or the message. In this embodiment, the new text/message processor 105 is one of the sub-routines called by the window procedure.

The new text/message addition unit 107 adds new text or a message at the end of a virtual list display area (message group data that can be displayed in the list display area 210). When the virtual list display area is smaller than the list display area 210, the new message is displayed in the list display area. When the virtual list display area is larger than the list display area 210, the list display area is not updated and only the position of the scroll bar is adjusted (when the automatic scroll mode is off), or the new message is added to the list display area, the oldest message is erased and the position of the scroll bar is adjusted (when the automatic scroll mode is on). In the preferred embodiment, the new text/message addition unit 107 is accomplished by a routine for executing SendMessage to LB_ADDSTRING to ListBox, which is the list display area manager 115.

The input event detector/converter 109 monitors an event entered in the input unit 121, and detects the occurrence of a specific input event. When a specific input event is detected, it is converted into an event corresponding to the type of input event, and the obtained event is transmitted to the event receiver 103. With this function, the input manipulation performed by a user via the graphical user interface can be converted into an event for changing of the scroll option. In this embodiment, the input event detector/converter 109 is implemented by a menu and a tool bar in the main window.

The scroll option change unit 111 changes a scroll option value, and performs a corresponding process. In this embodiment, the scroll option change unit 111 is provided as one of the sub-routines called by the window procedure.

The scroll option storage/referral unit 113 stores the current scroll option value in order to permit another function to be referred to. In the preferred embodiment of the present invention, the scroll option storage/referral unit 113 is installed as a static variable that can be referred to or changed by all the required functions.

The list display area manager 115 manages a text/message list in a buffer; draws, in the main display area, an area in the buffer having a designated range in accordance with an event, such as the existing situation in the current display area or the manipulation of the scroll bar; and adjusts the scroll bar. In the preferred embodiment, the list display area manager 115 is implemented by a ListBox Window that uses the scroll bar.

The initial processor 117 sets the initial value for the scroll option, and initializes necessary components, such as the input event detector/converter 109 and the list display area manager 115. In this embodiment, the initial scroll option value is set, the main window with a menu and a tool bar are created, and the ListBox Window is prepared in the main display area.

The latest text/message aligning unit 119 aligns the end of the list display area with the latest text/message in order to display the latest text/message. In this embodiment, the latest text/message aligning unit 119 is implemented by a routine for executing SendMessage of WM_VSCROLL/SB_BOTTOM to ListBox, which is the list display area manager 115.

The input unit 121 identifies the type of event entered by an operator, and converts it into event information. The scroll bar controller 123 controls the scroll bar, and the window drawing unit 125 generates image data to be drawn in the window. In the preferred embodiment, the functions of the input unit 121, the scroll bar controller 123 and the window drawing unit 125 are carried out by an operating system and by various device drivers.

An explanation has been given for the individual components (functional blocks) in FIG. 5. Each of these functional blocks represents a logical function, and is not provided by a single, independent hardware or software component (an application, an operating system or middleware), but by a combination of hardware and software components, or by common hardware or software components.

D. Explanation of Operation

Figure 6:
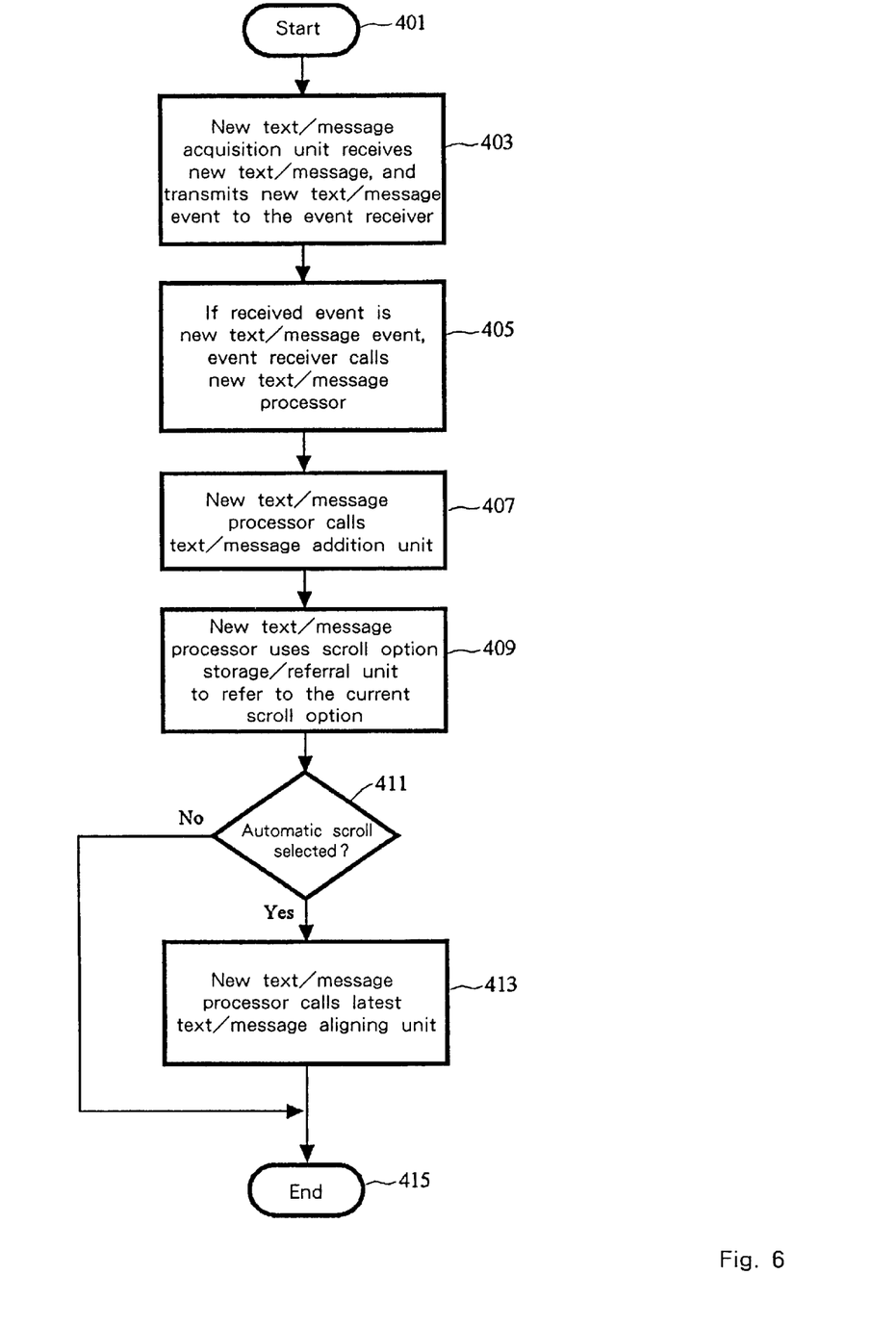
FIG. 6 is a flowchart showing processing performed by a display control apparatus 100 of the preferred embodiment of the present invention when it receives new text/message.

FIG. 6 is a flowchart showing processing performed, according to the embodiment of the present invention, by the display control system 100 when it receives new text/message. As is shown in FIG. 6, processing is initiated at step 401.

First, the new text/message receiving unit 101 receives new text/message that is generated by another application, and transmits it as a new text/message event to the event receiver 103 (step 403).

The event receiver 103 calls the new text/message processor 105 if the received event is a new text/message event (step 405).

The new text/message processor 105 then calls the new text/message addition unit 107 (step 407).

Figure 8:
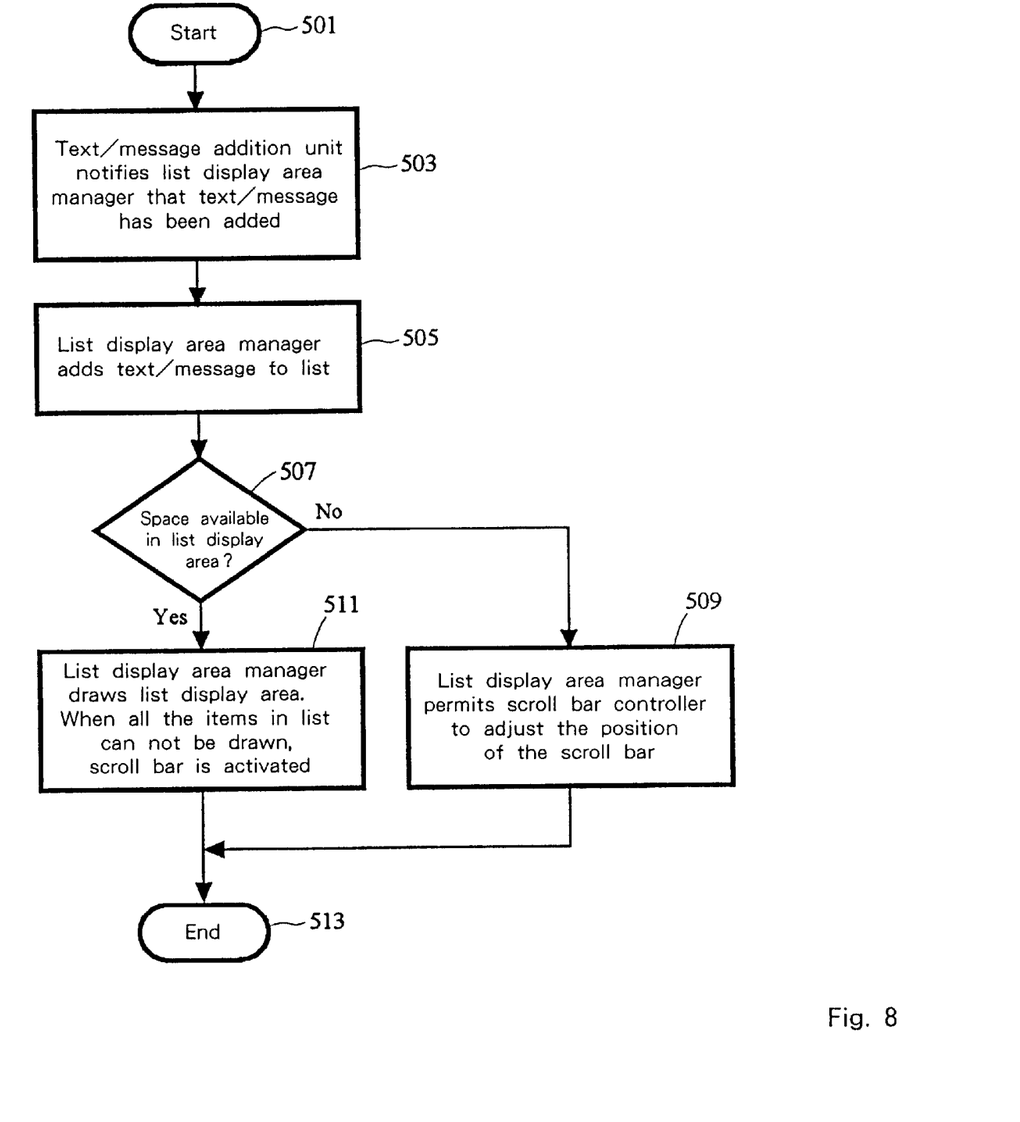
FIG. 8 is a flowchart showing processing performed in the preferred embodiment of the present invention to align latest text/message.

FIG. 8 is a flowchart showing processing of the embodiment for adding new text/message to the list display area. As is shown in FIG. 8, processing is begun at step 501.

The new text/message addition unit 119 notifies the list display area manager 115 that text/message has been added (step 503). Upon receiving the notification, the list display area manger 119 adds text/message to the list (step 505).

If extra space is available in the list display area (step 507), the list display area manager 119 permits the window drawing unit 125 to draw a list display area. If all the items in the list can not be drawn, a notification to that effect is transmitted to the scroll bar controller 123 in order to activate the scroll bar (step 511).

If no space is available in the list display area (step 507), the list display area manager 119 adjusts the position of the scroll bar (step 509).

The new text/message processor 105 uses the scroll option storage/referral unit 113 to refer to the current scroll option (step 409 in FIG. 6). If the automatic scroll mode is selected, the new text/message processor 105 calls the latest text/message aligning unit 119 (step 413).

Figure 9:
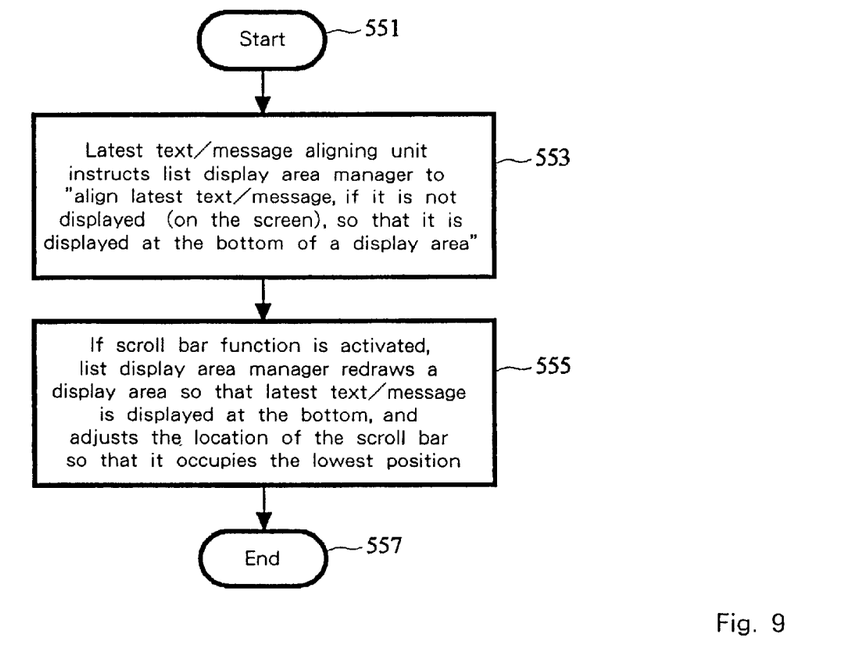
FIG. 9 is a flowchart showing processing performed in the preferred embodiment of the present invention to change a scroll option.

FIG. 9 is a flowchart showing processing performed in the embodiment to align the latest text/message. As is shown in FIG. 9, processing is begun at step 551.

If the latest text/message is not displayed, the latest text/message aligning unit 119 instructs the list display area manager 119 to align the latest text/message so that it is displayed at the bottom of the display area (step 553).

If the scroll bar function is activated, upon receiving this instruction the list display area manager 119 redraws the display area so that the latest text/message is displayed at the bottom, and adjusts the location of the scroll bar so that it occupies the lowest position.

Figure 7:
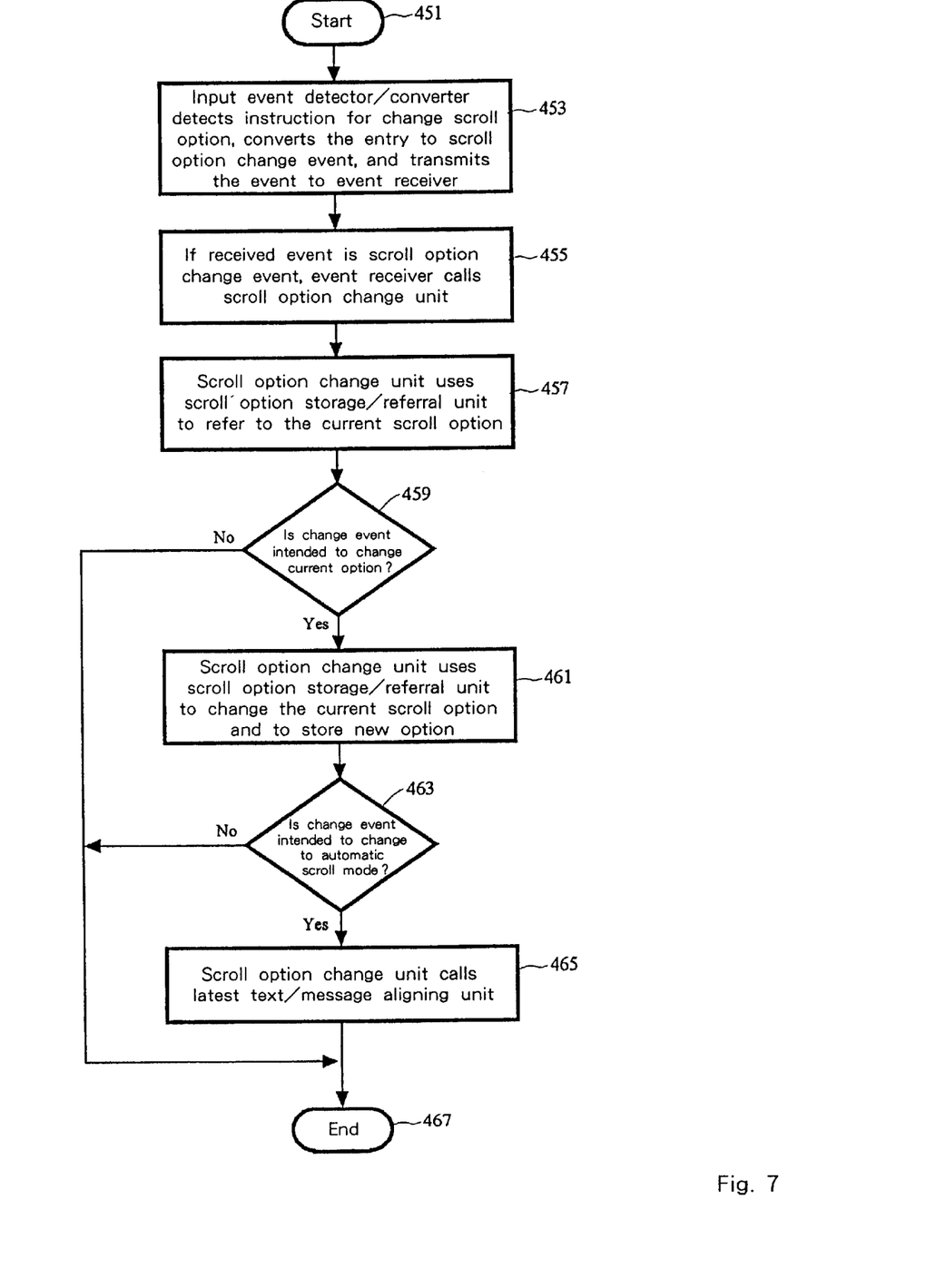
FIG. 7 is a flowchart showing processing performed in the preferred embodiment of the present invention to add new text/message to a list.

FIG. 7 is a flowchart showing processing in this embodiment for changing the scroll option. As is shown in FIG. 7, processing is begun at step 451.

The input event detector/converter 109 detects the entry by an operator of an instruction to change the scroll option. The input event detector/converter 109 then changes the entry into a scroll option change event and transmits it to the event receiver 103 (step 455).

The event receiver 103 calls the scroll option change unit 111 if the received event is a scroll option change event (step 455).

The scroll option change unit 111 thereafter uses the scroll option storage/referral unit 113 to refer to the current scroll option (step 457).

If it is ascertained that the intent of the scroll option change event is changing of the current option (step 459), the scroll option change unit 111 uses the scroll option storage/referral unit 113 to change the current scroll option and to store the new option (step 461).

When it is ascertained that the intent of the scroll option change event is changing of the option to the automatic scroll mode (step 463), the scroll option change unit 111 calls the latest text/message aligning unit 119 (step 465).

Figure 10:
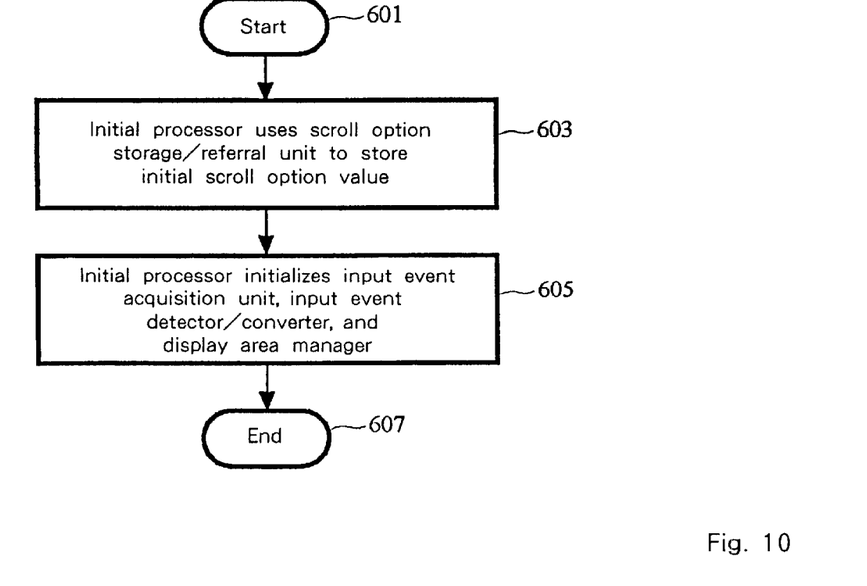
FIG. 10 is a flowchart showing initialization processing performed in the preferred embodiment of the present invention.

FIG. 10 is a flowchart showing initialization processing of the embodiment of the present invention. As is shown in FIG. 10, processing is begun at step 601.

When the initialization is started, the initial processor 117 uses the scroll option storage/referral unit 113 to store the initial scroll option value (step 603).

The initial processor 117 then initializes the event receiver 103, the input event detector/converter 109 and the list display area manager 115 (step 605).

As is described above, according to the present invention, an operator can continuously and dynamically elect either to refer to a new message or to an old message.

What is claimed is:

1. A display control method used by a display control apparatus, which includes a display device and an input device, that displays an obtained message, in the display area of a window with a scroll bar, said display control method comprising the steps of:

(a) storing scroll option information in response to a scroll option change operation performed by an operator;

(b) detecting the reception of a new message;

(c) referring to said stored scroll option information to determine whether an automatic scroll mode is thereby specified;

(d) removing from said display area, when it is ascertained at said step (c) that said automatic scroll mode is specified by said scroll option information, at least one portion of a message that is currently displayed, and displaying in said display area at least one portion of said new message; and (e) adding said new message to a virtual display area, when it is ascertained at said step (c) that said automatic scroll mode is not specified by said scroll option information, and setting a state wherein said operator can use said scroll bar to refer to a desired message included in said virtual display area.

2. A display control method used by a display control apparatus, which includes a display device and an input device and which displays an obtained message in the display area of a window with a scroll bar on said display device, said display control method comprising the steps of:

(a) referring to scroll option information, which is stored in advance in said display control apparatus, to determine whether said scroll option information specifies an automatic scroll mode;

(b) removing from said display area, when it is ascertained at said step (a) that said scroll option information specifies said automatic scroll mode, at least one portion of a message that is currently displayed, and displaying in said display area at least one portion of a received new message by said display control apparatus; and (c) adding said received new message to a virtual display area, when it is ascertained at said step (a) that said scroll option information does not specify said automatic scroll mode, and setting said display control apparatus to a state wherein said operator can use said scroll bar to refer to a desired message included in said virtual display area.

3. A display control apparatus, which includes a display device and an input device, that displays an obtained message, in the display area of a window with a scroll bar, said display control apparatus comprising:

(a) a scroll option change unit for storing scroll option information in response to a scroll option change operation performed by an operator;

(b) an input event detector for detecting the reception of a new message;

(c) a new message processor for referring to said stored scroll option information to determine whether an automatic scroll mode is thereby specified;

(d) a display area manager for, when it is ascertained that said automatic scroll mode is specified by said scroll option information, removing from said display area at least one portion of a message that is currently displayed, and displaying in said display area at least one portion of said new message, and for, when it is ascertained that said automatic scroll mode is not specified by said scroll option information, adding said new message to a virtual display area, and setting a state wherein said operator can use said scroll bar to refer to a desired message included in said virtual display area.

4. A storage medium storing a message display control software product for a display control apparatus, which includes a display device and an input device and which displays an obtained message, in the display area of a window with a scroll bar, said display control software product comprising:

(a) program code for instructing said display control apparatus to store scroll option information in response to a scroll option change operation performed by an operator;

(b) program code for instructing said display control apparatus to detect the reception of a new message;

(c) program code for instructing said display control apparatus to refer to said stored scroll option information to determine whether an automatic scroll mode is thereby specified;

(d) program code for instructing said display control apparatus to remove from said display area, when it is ascertained at said step (c) that said automatic scroll mode is specified by said scroll option information, at least one portion of a message that is currently displayed, and to display in said display area at least one portion of said new message; and (e) program code for instructing said display control apparatus to add said new message to a virtual display area, when it is ascertained at said step (c) that said automatic scroll mode is not specified by said scroll option information, and to set a state wherein said operator can use said scroll bar to refer to a desired message included in said virtual display area.

5. A storage medium storing a message display control software product for a display control apparatus, which includes a display device and an input device and which displays an obtained message in the display area of a window with a scroll bar on said display device, said display control software product comprising:

(a) program code for instructing said display control apparatus to refer to scroll option information, which is stored in advance in said display control apparatus, to determine whether said scroll option information specifies an automatic scroll mode;

(b) program code for instructing said display control apparatus to remove from said display area, when it is ascertained that said scroll option information specifies said automatic scroll mode, at least one portion of a message that is currently displayed, and to display in said display area at least one portion of received new message by said display control apparatus; and (c) program code for instructing said display control apparatus to add said received new message to a virtual display area, when it is ascertained that said scroll option information does not specify said automatic scroll mode, and to set said display control apparatus to a state wherein said operator can use said scroll bar to refer to a desired message included in said virtual display area.

* * * * *